(12) United States Patent
Acker et al.

(10) Patent No.: US 12,071,362 B2
(45) Date of Patent: Aug. 27, 2024

(54) METHOD AND SYSTEM FOR PRODUCING A GLASS CONTAINER, AND AIR BEARING

(71) Applicants: Gerresheimer Regensburg GmbH, Regensburg (DE); Gerresheimer Bünde GmbH, Bünde (DE)

(72) Inventors: Wolfram Acker, Kiel (DE); Richard Kiener, Oberviechtach (DE); Vladislav Löpp, Bünde (DE)

(73) Assignees: Gerresheimer Regensburg GmbH, Regensburg (DE); Gerresheimer Bünde GmbH, Bünde (DE)

( * ) Notice: Subject to any disclaimer, the term of this patent is extended or adjusted under 35 U.S.C. 154(b) by 0 days.

(21) Appl. No.: 17/338,396

(22) Filed: Jun. 3, 2021

(65) Prior Publication Data

US 2022/0002181 A1   Jan. 6, 2022

(51) Int. Cl.
  *C03B 33/095*   (2006.01)
  *C03B 23/045*   (2006.01)
  *C03B 33/06*   (2006.01)

(52) U.S. Cl.
  CPC ........ *C03B 33/0955* (2013.01); *C03B 23/045* (2013.01); *C03B 33/06* (2013.01)

(58) Field of Classification Search
  CPC ....... C03B 33/06; C03B 23/04; C03B 23/043; C03B 23/18; C03B 23/099; C03B 23/057;
  (Continued)

(56) References Cited

U.S. PATENT DOCUMENTS 1,799,019 A  *  3/1931  Mischler ............... C03B 23/045
                                                      279/151
3,278,286 A  *  10/1966  Nitsche .................. C03B 35/26
                                                      384/111
(Continued)

FOREIGN PATENT DOCUMENTS

CN        101774756 A  *  7/2010
CN        201720543 U  *  1/2011
(Continued)

OTHER PUBLICATIONS

Chen Siyan, Rejection Decision for Application No. 202110618348.7 Feb. 1, 2024; State Intellectual Property Office (Year: 2024).*
(Continued)

*Primary Examiner* — Alison L Hindenlang
*Assistant Examiner* — Steven S Lee
(74) *Attorney, Agent, or Firm* — Leydig, Voit & Mayer, Ltd.

(57) ABSTRACT

The invention relates to a system for producing a particularly rotationally symmetrical glass container, such as a glass syringe, a glass carpule, a glass vial, or a glass ampoule, from a particularly rotationally symmetrical glass tube blank, which defines a rotational axis, comprising a chuck for mounting the glass tube blank in a rotating manner, a length-cutting device for cutting to length glass containers of predetermined length from the glass tube blank, and an air bearing, which is arranged downstream of the chuck and upstream of the length-cutting device, for contactlessly mounting the glass tube blank.

11 Claims, 6 Drawing Sheets

(58) Field of Classification Search
CPC ....... C03B 23/045; C03B 23/00; C03B 35/26; C03B 23/03; C03B 33/08; C03B 33/01
See application file for complete search history.

(56) References Cited

U.S. PATENT DOCUMENTS

| | | | | |
|---|---|---|---|---|
| 3,627,505 | A * | 12/1971 | Engel | C03B 29/06 65/174 |
| 4,113,324 | A * | 9/1978 | Rohr | F16C 35/00 384/247 |
| 4,184,721 | A * | 1/1980 | Gemein | F16C 32/0659 384/116 |
| 4,226,607 | A * | 10/1980 | Domken | C03B 33/085 65/109 |
| 4,312,659 | A * | 1/1982 | Panarello | C03B 35/26 65/84 |
| 4,552,576 | A * | 11/1985 | Hara | C03B 37/014 65/378 |
| 4,632,574 | A * | 12/1986 | Wilson | C03B 23/06 384/100 |
| 4,636,239 | A * | 1/1987 | Wilson | C03B 37/01869 65/109 |
| 5,178,401 | A * | 1/1993 | Mannl | C03B 23/112 279/157 |
| 6,363,750 | B1 * | 4/2002 | Chiodo | C03B 23/0473 65/276 |
| 6,978,641 | B2 * | 12/2005 | Sugiyama | C03B 37/0126 65/433 |
| 7,093,464 | B2 * | 8/2006 | Dick | C03B 35/26 65/182.1 |
| 9,206,069 | B2 * | 12/2015 | Pulz | C03B 23/043 |
| 9,388,068 | B2 * | 7/2016 | Hoshiba | C03B 33/105 |
| 2004/0129027 | A1 * | 7/2004 | Sugiyama | C03B 37/0126 65/433 |
| 2007/0169515 | A1 * | 7/2007 | Tobisaka | C03B 23/045 65/483 |
| 2013/0291601 | A1 * | 11/2013 | Otosaka | C03B 23/047 65/435 |
| 2016/0244354 | A1 * | 8/2016 | Segner | C03B 23/095 |
| 2017/0283299 | A1 * | 10/2017 | Bookbinder | C03B 33/0955 |
| 2018/0215649 | A1 * | 8/2018 | Wada | B28D 7/02 |
| 2019/0002333 | A1 * | 1/2019 | Völkl | C03B 33/06 |
| 2019/0161380 | A1 * | 5/2019 | Gaylo | C03B 23/095 |
| 2019/0161384 | A1 * | 5/2019 | Mcenroe | C03B 23/099 |

FOREIGN PATENT DOCUMENTS

| | | | | |
|---|---|---|---|---|
| CN | 103128225 | A * | 6/2013 | |
| CN | 203509558 | U * | 4/2014 | |
| CN | 205223000 | U * | 5/2016 | |
| CN | 108249744 | A * | 7/2018 | |
| CN | 112159085 | A * | 1/2021 | ............ B28D 1/14 |
| DE | 3125521 | A1 | 3/1982 | |
| DE | 202004004560 | U1 * | 8/2004 | .......... C03B 23/045 |
| EP | 0187230 | A2 | 7/1986 | |
| EP | 0235191 | B1 | 5/1989 | |
| GB | 335249 | A * | 9/1930 | .......... C03B 33/085 |
| GB | 335249 | A * | 11/1930 | |
| GB | 1025500 | A | 4/1966 | |
| GB | 1025500 | A * | 4/1966 | |
| GB | 1025500 | A * | 5/1966 | ............ C03B 35/26 |
| JP | 2001002441 | A * | 1/2001 | ............ C03B 35/26 |
| JP | 2003048736 | A * | 2/2003 | .......... C03B 23/045 |
| WO | WO-2004048283 | A1 * | 6/2004 | ............ B23B 31/18 |

OTHER PUBLICATIONS

European Search Report dated Feb. 3, 2022 in corresponding European Application No. 21176080.6.
U.S. Appl. No. 17/338,410, filed Jun. 3, 2021.
U.S. Appl. No. 17/338,419, filed Jun. 3, 2021.
U.S. Appl. No. 17/338,430, filed Jun. 3, 2021.
U.S. Appl. No. 17/338,439, filed Jun. 3, 2021.

* cited by examiner

METHOD AND SYSTEM FOR PRODUCING A GLASS CONTAINER, AND AIR BEARING

CROSS-REFERENCE TO RELATED APPLICATIONS

This application claims the benefit of German Application No. 10 2020 114 883.6, filed Jun. 4, 2020, which is hereby incorporated by reference in its entirety.

BACKGROUND OF THE INVENTION

The present invention relates to a method and a system for producing a glass container, such as a glass syringe or a glass ampoule, from a glass tube blank and to an air bearing for such a system.

Glass bodies for glass syringes or glass ampoules are subject to very low manufacturing tolerances, so that, on the one hand, a high product quality can be ensured, and on the other hand, the partially standardized interfaces, for example in the funnel-shaped end section, can be maintained. A further factor affecting the quality or accuracy of the glass container is given by the manufacturing-specific tolerances when cutting to length glass container blanks from the glass tube blank. In the production of rotationally symmetrical glass tubes in the prior art, the glass tubes are scored, heated, shock-cooled, and reheated at a predefined position along the longitudinal axis of the glass tube in order to separate the (endless) glass tubes to a particular length. During processing, the glass tube is rotated about its longitudinal axis and, after a separation operation, is displaced in the direction of the longitudinal axis, such that a downstream separation operation can be carried out.

Until now, the mounting took place in a chuck, which allows the glass tube to only rotate about its longitudinal axis. The bearing is arranged such that the glass tube longitudinal axis is oriented vertically. For vertical positioning of the glass tubes, stop plates are provided below the chuck. For this purpose, the chuck must be opened, such that the glass tube held by the chuck is released and, due to gravity, falls vertically downward onto the stop plates when the chuck is open. For the downstream translational ejection of the separated glass container along its longitudinal axis and for preparing the glass tube for a further separation operation, the chuck must be opened again, in order to release and move the glass tube, as a result of which the separated glass container could fall into a further processing station under the influence of gravity and the glass tube was again dropped toward the stop plates under the influence of gravity. A schematic representation of a tube cutter under the prior art is enclosed as FIG. 1 with the present application documents.

The production process has been proven in principle. However, the inventors of the present invention have found that damage to the glass containers can occur, particularly when the glass tubes are dropped onto the stop plates. A further disadvantage of the previous method is that the bearing is subject to wear and soiling. There is also only a limited possibility of handling the glass tubes, since they can only be inserted into the chuck along their longitudinal axis. Furthermore, a considerable span length of the chuck is necessary, in order to be able to hold the glass tube sufficiently stably in vertical alignment, in order to allow the glass tube to be cut satisfactorily.

BRIEF SUMMARY OF THE INVENTION

The object of the present invention is to overcome the disadvantages of the prior art, particularly to improve a glass-container production system, and/or to provide a bearing for a glass tube processing station that is structurally simple to implement and less prone to wear and soiling and with which damage to the glass tube is avoided and/or which is more flexible in terms of handling.

This object is achieved by the features of the independent claims.

Accordingly, a system for producing a glass container, particularly a rotationally symmetrical glass container, such as a glass syringe, a glass carpule, a glass vial or a glass ampoule, is provided. The glass-container production system produces the particularly rotationally symmetrical glass container from a particularly rotationally symmetrical glass tube blank, which defines a rotational axis. For example, the glass-container production system can be continuously loaded with glass tube blanks, which are stockpiled in a storage warehouse, for example, which can be located in the immediate vicinity of the glass-container production system, for example. The glass-container production system can also be configured such that it is directly loaded by a glass-blowing station, particularly with an endless glass tube blank.

The system according to the invention comprises a chuck for rotatably mounting the glass tube blank. In the case of a rotationally symmetrical glass tube blank, the rotational axis corresponds to the central axis of the glass tube blank. The chuck, also called a jaw chuck, is configured to encompass and firmly hold the glass tube blank at least circumferentially in sections. For example, the jaw chuck can be coupled to a driving device, such as a motor, which causes the rotation of the chuck and thus of the glass tube blank. For example, the chuck can be a three-jaw chuck. The jaw chuck can also serve to fix the glass tube blank in its position along its longitudinal axis, such that processing operations, particularly shaping, such as a deformation or a separation operation, can be performed.

The system furthermore comprises a length-cutting device for cutting to length glass containers of predetermined length from the glass tube blank. By means of the system, glass containers can be automatically cut to length from the glass tube blank in accordance with a predefined desired length as viewed in the longitudinal direction of the glass tube blank. A particular length can also be understood to mean that an individual length is adjusted, for example entered manually or queried from a centrally stored control program, before each individual separation operation of each individual glass container. The length-cutting device can carry out a plurality of substeps or have a plurality of substations. For example, the length-cutting operation takes place essentially contactlessly, for example by the introduction of heat and the resulting material stress inside the glass tube blank, which leads to a separation, particularly a splitting off, of the glass container from the glass tube blank. For example, the length-cutting can comprise the following steps or the length-cutting device can comprise the following stations: scoring of the glass tube blank; locally heating the glass tube blank, particularly in the region of the scoring point, for example by a burner or a $CO_2$ laser; subsequent local cooling, particularly by applying a cooling-fluid flow, particularly a cooling-air flow or a cooling-liquid flow, of the scored and locally heated region of the glass tube blank; and locally reheating the glass tube blank region to which the cooling-fluid flow was applied, in order to initiate the separation of the glass container, for example by so-called thermal shock splitting; optionally fusing the separation point, in order to close the glass tube blank at the end.

According to the invention, the system comprises an air bearing, arranged downstream of the chuck and upstream of the length-cutting device, for contactlessly mounting the glass tube blank. The air bearing can be designed according to one of the following aspects or exemplary embodiments according to the invention. The terms "upstream" and "downstream" are to be understood with respect to a glass tube blank longitudinal axis. The glass tube blank can be encompassed by means of the air bearing at least partially contactlessly in the circumferential direction, in order to transfer a contactless holding and/or bearing force to the glass tube blank. On the glass side, the air bearing ensures continuous rotation of the glass tube blank about its rotational axis. In general, a particularly thin air film is formed in the air bearing between the glass tube blank and the air bearing and separates the glass tube blank and the air bearing from one another, particularly brings about the contactless mounting. Air bearings are known to be characterized by stick-slip-free and friction-free bearing properties. Surprisingly, the air bearing has also proven to be advantageous and suitable for use in glass-container production systems, since the air flow, occurring in the air bearing, for allowing the contactless mounting of the glass tube blank also has a cleaning effect, particularly a self-cleaning effect. Glass and/or dirt particles adhering to the glass tube blank are removed by the air flow, such that the surface of the glass tube blank is essentially free of particles and/or soiling. In general, the air bearing utilizes the Bernoulli effect and allows a degree of freedom of movement of the glass tube blank both rotationally in the rotational direction and translationally displaceably along its glass tube longitudinal direction. The air bearing can be designed to absorb all relevant forces, particularly the weight force of the glass tube blank and process forces, for example due to the rotation of the glass tube blank, without contacting the glass tube blank.

According to an exemplary embodiment of the system according to the invention, the air bearing has a receptacle for the glass tube blank extending along the rotational axis of the glass tube blank, which corresponds particularly to the glass tube blank longitudinal axis. The receptacle can form that component of the air bearing, which directly faces the glass tube blank and which is responsible for the contactless mounting and holding of the glass tube blank. The receptacle can be adapted at least in sections to the shape of an outer circumference of the particularly rotationally symmetrical glass tube blank. For example, it can be ensured that a distance existing between the glass tube blank and the receptacle due to the contact-free mounting of the glass tube blank is essentially constant. Alternatively or additionally, the receptacle can be partially open in cross-section, such that the glass tube blank can be inserted into the receptacle in a direction transverse to the rotational axis. In systems under the prior art, it has hitherto been possible to insert the glass tube blanks into the jaw chuck and the bearings provided for this purpose only along the rotational or glass tube blank longitudinal axis. The system according to the invention is now considerably more flexible in terms of handling and orientation.

According to an exemplary development of the system according to the invention, the receptacle is essentially partially cylindrical. Particularly, the receptacle forms a partially cylindrical receiving region, into which the rotationally symmetrical glass tube blank is inserted and in which it is partially received. According to one exemplary embodiment, the receptacle is formed concavely in sections, particularly in order to form the partially cylindrical shape. Alternatively or additionally, the receptacle can be shaped convexly in sections. A concave section of the receptacle can form a receptacle base and/or a convex section can form a receptacle side flank at least in sections. The receptacle base can end in two receptacle side flanks. Particularly, the receptacle has a particularly concave receptacle base and two opposing receptacle side flanks. Furthermore, the receptacle side flanks can be formed concavely in sections, wherein particularly the concave region of the receptacle side flanks is arranged directly adjacent to the receptacle base. According to another exemplary embodiment, the receptacle is formed in multiple parts. In this case, the receptacle side flanks can be produced from one part and the receptacle base can be produced from at least one further part.

In a further exemplary embodiment of the present invention, the air bearing is arranged at an axial position of the system in the range of ⅓ to ⅔ of an axial distance between the length-cutting device and the chuck. The axial position or the axial direction is to be understood here as the longitudinal axis direction with respect to the rotational axis direction and/or the glass tube blank. Alternatively, the system can have at least one further air bearing for contactlessly mounting the glass tube blank. In this case, an air bearing on the chuck side can be located at an axial position in the range of ¼ to ½ of an axial distance between the length-cutting device and the chuck. An air bearing on the side of the length-cutting device can be located at an axial position of at least ¾ of an axial distance between the length-cutting device and the chuck. According to one exemplary development, the air bearing on the side of the length-cutting device is located in the immediate vicinity of the length-cutting device. The described arrangements of the at least one air bearing provide stable mounting for the glass tube blank, in order to be able to reliably carry out the following length-cutting operation.

According to a further aspect of the present invention, which can be combined with the preceding aspects and exemplary embodiments, a system for producing a particularly rotationally symmetrical glass container, such as a glass syringe, a glass carpule, a glass vial or a glass ampoule, from a particularly rotationally symmetrical glass tube blank, which defines a rotational axis, is provided.

The system comprises a length-cutting device for cutting to length glass containers of predetermined length from the glass tube blank. By means of the system, glass containers can be automatically cut to length from the glass tube blank in accordance with a predefined desired length as viewed in the longitudinal direction of the glass tube blank. A particular length can also be understood to mean that an individual length is adjusted, for example entered manually or queried from a centrally stored control program, before each individual separation operation of each individual glass container. The length-cutting device can carry out a plurality of substeps or have a plurality of substations. For example, the length-cutting operation takes place essentially contactlessly, for example by the introduction of heat and the resulting material stress inside the glass tube blank, which leads to a separation, particularly a splitting off, of the glass container from the glass tube blank. For example, the length-cutting can comprise the following steps or the length-cutting device can comprise the following stations: scoring of the glass tube blank; locally heating the glass tube blank, particularly in the region of the scoring point, for example by a burner or a $CO_2$ laser; subsequent local cooling, particularly by applying a cooling-fluid flow, particularly a cooling-air flow or a cooling-liquid flow, of the scored and locally heated region of the glass tube blank; and locally reheating the glass tube blank region to which the cooling-fluid flow was applied, in order to initiate the separation of the glass container, for example by so-called thermal shock splitting; optionally fusing the separation point, in order to close the glass tube blank at the end.

According to the invention, the system comprises a chuck, arranged upstream of the length-cutting device, for the rotating mounting of the glass tube blank. The term "upstream" is to be understood with respect to the glass tube blank as the rotational axis direction or its glass tube blank longitudinal axis. In the case of a rotationally symmetrical glass tube blank, the rotational axis corresponds to the central axis of the glass tube blank. The chuck, also called a jaw chuck, is configured to encompass and firmly hold the glass tube blank at least circumferentially in sections. For example, the jaw chuck can be coupled to a driving device, such as a motor, which causes the rotation of the chuck and thus of the glass tube blank. For example, the chuck can be a three-jaw chuck. The jaw chuck can also serve to fix the glass tube blank in its position along its longitudinal axis, such that processing operations, particularly shaping, such as a deformation or a separation operation, can be performed.

According to the further aspect of the present invention, the chuck has a feeding device for particularly horizontal displacement of the glass tube blank. For example, the feeding device is designed to exclusively displace the glass tube blank in an essentially translational manner. The feeding device can be a separate component with respect to a driving device for rotating the glass tube blank by means of the chuck. An advantage of the feeding device assigned to the chuck is that the chuck that holds and rotates the glass tube blank no longer has to be opened, in order to displace the glass tube blank particularly horizontally and/or translationally. The chuck accordingly has a degree of freedom of rotation and a degree of freedom of translation. As a result, time during the production of glass containers can be saved and the cycle time for producing the glass containers can be increased. The step of opening the jaw chuck, which is necessary in the prior art, before translationally advancing the glass tube blank can now be dispensed with. A glass tube blank from which, as a rule, a plurality of glass containers can be produced can now be cut to length several times without opening the chuck. In this case, it is not necessary to move the length-cutting device. By means of the feeding device, the glass tube blank can be moved further after a separation operation of a first glass container, in order to bring the glass tube blank again into a length-cutting position with respect to the length-cutting device. Particularly, the glass tube blank can be displaced at least to such an extent, particularly horizontally and/or translationally, that after a first separation operation, at least one further separation operation for producing a further glass container of the predetermined length, i.e., axial length, can be produced.

According to an exemplary development of the system according to the invention, the feeding device is configured in such a way that it can displace the glass tube blank along with the chuck particularly horizontally and/or translationally. The rotating mounting of the glass tube blank inside the chuck can thus be maintained while the glass tube blank is displaced particularly in the direction of the length-cutting device.

According to a further exemplary embodiment of the system according to the invention, the chuck can be displaced, particularly translationally and/or horizontally, relative to a stationary housing of the system. For example, the housing or also the frame is placed on a foundation, for example a factory floor.

According to an exemplary development of the system according to the invention, the chuck is mounted, particularly translationally and/or horizontally displaceably, on a stationary housing of the system by means of a linear guide, for example a rail guide. By means of the linear guide, the chuck along with the glass tube blank can be moved linearly relative to the housing and the length-cutting device. For example, the linear guide can be designed as a rail guide that can have a movable guide carriage, which is attached to the chuck, and at least one stationary rail, which is particularly fixed to the housing and with respect to which the guide carriage can be displaced linearly.

In a further exemplary embodiment of the system according to the invention, the feeding device is configured to move the glass tube and optionally the chuck stepwise translationally, particularly in the direction of the length-cutting device, and/or away from the length-cutting device. For example, the feeding device can have a stepping motor or can be coupled to a stepping motor. However, it is also possible to design a continuous translational displacement of the chuck. For example, the stepwise translational displacement of the chuck can be matched to a process cycle time and/or a process flow. For example, the feeding device becomes active for translational displacement of the chuck when a separation operation has been completed. During the separation operation, it can be ensured that the feeding device is deactivated, such that the chuck does not move and is stationary.

According to an exemplary development of the system according to the invention, the feeding device has particularly predetermined and/or preset movement increments. The movement increments, which define translational, particularly horizontal, displacement movements of the chuck along with the glass tube blank, can be matched to a predetermined axial length of the glass containers. This ensures that the glass tube blank is advanced in the glass tube blank longitudinal direction exactly by that length which corresponds to an axial length of the glass container to be produced, such that the glass tube blank is again in position for a downstream separation operation.

According to a further aspect of the present invention, which can be combined with the preceding aspects and exemplary embodiments, a system for producing a particularly rotationally symmetrical glass container, such as a glass syringe, a glass carpule, a glass vial or a glass ampoule, from a particularly rotationally symmetrical glass tube blank, which defines a rotational axis, is provided.

The system comprises a length-cutting device for cutting to length glass containers of predetermined length from the glass tube blank. By means of the system, glass containers can be automatically cut to length from the glass tube blank in accordance with a predefined desired length as viewed in the longitudinal direction of the glass tube blank. A particular length can also be understood to mean that an individual length is adjusted, for example entered manually or queried from a centrally stored control program, before each individual separation operation of each individual glass container. The length-cutting device can carry out a plurality of substeps or have a plurality of substations. For example, the length-cutting operation takes place essentially contactlessly, for example by the introduction of heat and the resulting material stress inside the glass tube blank, which leads to a separation, particularly a splitting off, of the glass container from the glass tube blank. For example, the length-cutting can comprise the following steps or the length-cutting device can comprise the following stations: scoring of the glass tube blank; locally heating the glass tube blank, particularly in the region of the scoring point, for example by a burner or a $CO_2$ laser; subsequent local cooling, particularly by applying a cooling-fluid flow, particularly a cooling-air flow or a cooling-liquid flow, of the scored and locally heated region of the glass tube blank; and locally reheating the glass tube blank region to which the cooling-fluid flow was applied, in order to initiate the separation of the glass container, for example by so-called thermal shock splitting; optionally fusing the separation point, in order to close the glass tube blank at the end.

According to further aspects of the present invention, the system comprises a chuck, particularly a jaw chuck, arranged upstream of the length-cutting device, for the rotating mounting of the glass tube blank, which mounts the glass raw blank in a rotating manner in such a way that the rotational axis of the glass raw blank is oriented essentially horizontally. The term "upstream" is to be understood with respect to the glass tube blank as the rotational axis direction or its glass tube blank longitudinal axis. In the case of a rotationally symmetrical glass tube blank, the rotational axis corresponds to the central axis of the glass tube blank. The chuck, also called a jaw chuck, is configured to encompass and firmly hold the glass tube blank at least circumferentially in sections. For example, the jaw chuck can be coupled to a driving device, such as a motor, which causes the rotation of the chuck and thus of the glass tube blank. For example, the chuck can be a three-jaw chuck. The jaw chuck can also serve to fix the glass tube blank in its position along its longitudinal axis, such that processing operations, particularly shaping, such as a deformation or a separation operation, can be performed. The inventors of the present invention have found that as a result of a horizontal orientation of the glass raw blank during its processing, damage to the glass raw blanks and particularly to the glass containers can be avoided in a structurally simple manner. For conveying or advancing the glass raw blank and also the separated glass containers, they are now no longer dropped by utilizing gravity and caught by stop plates on which they impinge with their separated/end faces, which may involve damage, but are conveyed and removed in a controlled manner in the horizontal direction. Furthermore, due to the horizontal orientation, insertion of the glass raw blanks transversely to their rotational and/or glass tube blank longitudinal axis direction is simplified. As a result, the system is considerably more flexible in terms of handling.

According to an exemplary embodiment of the system according to the invention, the chuck has a span length of less than 80 mm, particularly of less than 60 mm, less than 40 mm or less than 20 mm, for example of approximately 10 mm. The span length can be understood to be that axial length, around which the glass raw blank is encompassed and held within the chuck. In order to be able to clamp and rotate the glass raw blanks in vertical orientation or alignment such that they rotate and are mounted sufficiently stably, in order to not thrash and to rotate as much as possible without deviations, considerable axial span lengths within the chuck were necessary. The present invention now makes it possible to considerably save installation space in the axial direction and to be able to dimension the chuck considerably smaller, particularly to make it more cost-effective.

According to a further aspect of the present invention, which can be combined with the preceding aspects and exemplary embodiments, an air bearing for a system, designed particularly according to one of the preceding aspects or exemplary embodiments, for producing a rotationally symmetrical glass container, such as a glass syringe, a glass carpule, a glass vial or a glass ampoule, from a rotationally symmetrical glass tube blank, which defines a rotational axis, is provided. The terms "upstream" and "downstream" are to be understood with respect to a glass tube blank longitudinal axis.

The glass tube blank can be encompassed by means of the air bearing at least partially contactlessly in the circumferential direction, in order to transfer a contactless holding and/or bearing force to the glass tube blank. On the glass side, the air bearing ensures continuous rotation of the glass tube blank about its rotational axis. In general, a particularly thin air film is formed in the air bearing between the glass tube blank and the air bearing and separates the glass tube blank and the air bearing from one another, particularly brings about the contactless mounting.

The air bearing according to the invention comprises a compressed-air source. The compressed-air source can be designed to produce compressed air of up to 5 bar. For example, the compressed-air source produces compressed air in the range of 1 bar to 4 bar. For example, the compressed-air source can be controlled, in order to be able to adjust the level of the compressed air. The compressed air can be matched to a weight force of the glass tube blank to be mounted. As a rule, the compressed air must be selected such that suction force and repulsion force with respect to the glass tube blank are canceled, such that the glass tube blank can be reliably mounted.

The air bearing according to the invention furthermore comprises a receptacle for the glass tube blank extending along the rotational axis of the glass tube blank, particularly along the glass tube blank longitudinal axis. The receptacle can be that component of the air bearing which directly faces the glass tube blank, surrounds it at least circumferentially in sections and thus mounts it. The receptacle can be adapted at least in sections to the shape of an outer circumference of the rotationally symmetrical glass tube blank in such a way that the glass tube blank is contactlessly mounted when the receptacle is supplied with compressed air from the compressed-air source. A particularly friction-free mounting of the glass tube blank is thereby possible. Furthermore, the air bearing of the glass tube blank is characterized by a self-cleaning effect, since dirt and/or glass particles can be removed by means of the provided air flow. Furthermore, the air bearing according to the invention offers a degree of freedom of rotation and a degree of freedom of translation for the glass tube blank, such that on the one hand, it can be mounted in a contactless rotating manner and on the other hand, it is possible to displace the glass tube blank in a contactless translational manner relative to the air bearing, particularly to the receptacle, while maintaining the bearing forces. Particularly, the compressed-air source is configured to generate an air film that flows around the glass tube blank and flows along the receptacle and that on the one hand adjusts the freedom of contact between air bearing, particularly receptacle, and glass tube blank. In general, the air bearing utilizes the Bernoulli effect and allows a degree of freedom of movement of the glass tube blank both rotationally in the rotational direction and translationally displaceably along its glass tube longitudinal direction. The air bearing can be designed to absorb all relevant forces, particularly the weight force of the glass tube blank and process forces, for example due to the rotation of the glass tube blank, without contacting the glass tube blank.

According to an exemplary development of the air bearing according to the invention, the glass tube blank is contactlessly mounted in the receptacle in such a way that a distance, particularly a vertical distance, between receptacle, particularly a central receptacle base, between receptacle and glass tube blank is in the range of 0.05 mm to 0.5 mm, particularly in the range of 0.01 mm to 0.3 mm, particularly approximately 0.2 mm.

According to a further exemplary embodiment of the air bearing according to the invention, the receptacle is essentially partially cylindrical. Particularly, that region of the receptacle is partially cylindrical and/or partially open that surrounds the rotationally symmetrical glass tube blank at least circumferentially in sections. For example, the receptacle is concavely shaped in sections and/or convexly shaped in sections. Furthermore, the receptacle can be designed in multiple parts or can be produced from a plurality of parts. A concave section of the receptacle, for example, forms a receptacle base and/or a convex section forms a receptacle side flank at least in sections. For example, two opposite receptacle side flanks and an intervening receptacle base are provided. In this case, the receptacle side flanks can be produced from one piece. The receptacle base can be produced from another piece separate from the receptacle side flanks.

According to a further exemplary embodiment of the present invention, the receptacle has a particularly concave receptacle base and two opposite receptacle side flanks, which are particularly convex, i.e., convex in sections, and each of which is arranged at a distance essentially constant in the rotational axis direction or glass tube blank longitudinal axis direction, forming a gap space to the receptacle base. For example, the distance is in the range of 0.05 mm to 0.15 mm, for example approximately 0.09 mm. The gap space can form a fluid connection between the compressed-air source and the receptacle, particularly the receiving space, in which the glass tube blank is at least partially received. For example, the system is designed such that the compressed air provided by the compressed-air source passes via the gap space into the receptacle, wherein the gap space is responsible for producing the Bernoulli effect, in order to provide the holding forces in the receptacle for the glass tube blank.

According to a further aspect of the present invention, which can be combined with the preceding aspects and exemplary embodiments, a method for producing a particularly rotationally symmetrical glass container, such as a glass syringe, a glass carpule, a glass vial or a glass ampoule, is provided.

A glass tube blank, which defines a rotational axis, is provided according to the method according to the invention. For example, the glass-container production system can be continuously loaded with glass tube blanks, which are stockpiled in a storage warehouse, for example, which can be located in the immediate vicinity of the glass-container production system, for example. The glass-container production system can also be configured such that it is directly loaded by a glass-blowing station, particularly with an endless glass tube blank.

Furthermore, the glass tube blank is continuously rotated about its rotational axis and contactlessly mounted in sections in a rotating manner, particularly by means of an air bearing designed according to one of the above aspects or exemplary embodiments.

Furthermore, the method according to the invention can comprise the length-cutting step, with which the glass tube blank is deflected to a predetermined length, particularly axial length, in order to separate the glass container.

According to a further aspect of the present invention, which can be combined with the preceding aspects and exemplary embodiments, a method for producing a particularly rotationally symmetrical glass container, such as a glass syringe, a glass carpule, a glass vial or a glass ampoule, is created.

A glass tube blank, which defines a rotational axis, is provided in the method according to the invention.

Furthermore, the glass tube blank is continuously rotated about its rotational axis, which essentially corresponds to a glass tube blank longitudinal axis, and displaced particularly stepwise in the rotational axis direction. The displacement can take place, for example, translationally and/or essentially exclusively horizontally.

The rotational axis of the glass tube blank is oriented essentially horizontally according to the method according to the invention.

According to an exemplary embodiment of the method according to the invention, the method is designed to realize the system according to the invention in accordance with one of the above-described aspects or exemplary embodiments.

Preferred developments are specified in the dependent claims.

BRIEF DESCRIPTION OF THE DRAWINGS

Other properties, features and advantages of the invention become apparent below from the description of preferred embodiments of the invention with reference to the accompanying exemplary drawings, which show.

DETAILED DESCRIPTION OF THE INVENTION

Figure 1:
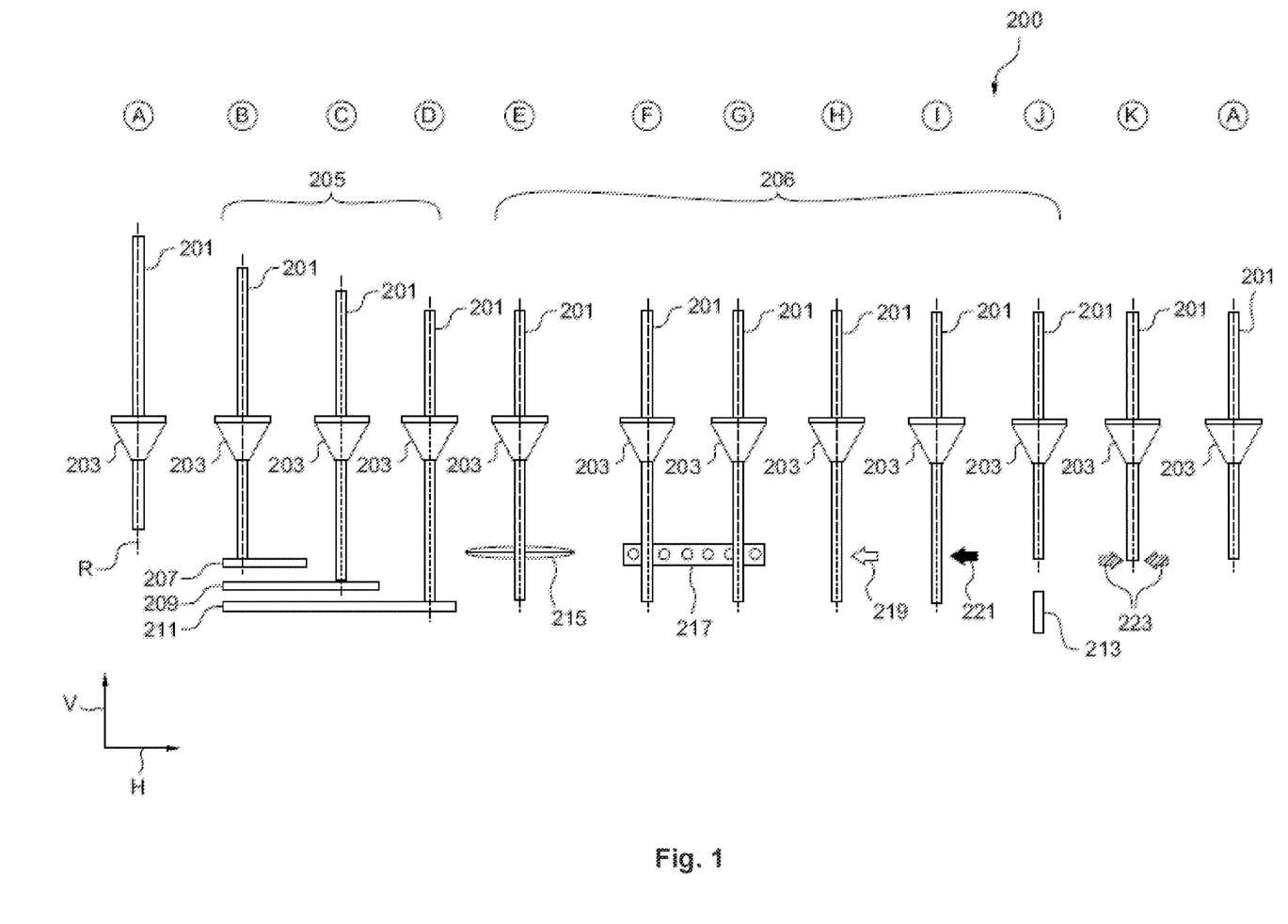
FIG. 1 a schematic representation of a tube cutter under the prior art of a glass processing system.

A tube cutter tube cutter according to the prior art, which is in general provided with reference number 200, of a glass processing system according to the prior art is explained with reference to FIG. 1. In principle, the tube cutter 200 serves to separate glass containers from a glass tube blank 201. The individual processing operations or stations are denoted by consecutive capital letters A-K. At A, a rotationally symmetrical glass tube blank 201 is provided and mounted in a rotating manner by a chuck 203. A glass tube blank longitudinal direction, which at the same time corresponds to the rotational axis of the glass tube blank 201, is denoted by reference sign R. As can be seen in FIG. 1, at A, the glass tube blank 201 protrudes axially downward from the chuck 203. Glass tube blank 201 and jaw chuck 203 are oriented in the vertical direction V. The stations B-D relate to a positioning station 205, which serves to align the glass tube blank 201 with respect to the vertical direction V. This takes place by means of stop plates 207, 209 and 211, which are assigned to the respective stations B-D and extend essentially in the horizontal direction H and toward which the glass tube blank 201 is dropped when the chuck 203 is open. The stop plates 207, 209, 211 are arranged at a predetermined vertical distance with respect to the chuck 203, such that the same vertical distance between jaw chuck 203 and stop plates 207, 209, 211 is always achieved, such that essentially the same axial length of glass containers 213 (station J) can always be separated by means of the downstream separation operation.

After positioning the glass tube blank 201 with respect to the vertical direction V, the glass tube blank 201 is again grabbed and fixed by the chuck 203, in order to fix the vertical position of the glass tube blank 201. Steps E to J essentially summarize the separation operation 206: At E, the separation operation is prepared, for example by means of scoring by a scoring knife 215; at stations F and G, intense heating takes place, particularly in a local region on the glass tube blank 201, for example by means of a ribbon burner 217; at H, a cooling operation takes place, for example by means of a cooling-air flow or a cooling-fluid flow 219; at I, a local reheating, which results in a thermal shock splitting, is indicated by means of the arrow with reference sign 221; below J, it can be seen that the glass container 213 cut or separated to length is separated from the remaining glass tube blank 201 and falls downward in the vertical direction V; at K, an optional melting operation, indicated by the arrows with reference sign 223, can take place, in order to close the glass tube blank 201 remaining in the chuck 203 at the end face, for example in order to form a base of a glass container 213.

The process can subsequently begin from the beginning A and the remaining glass tube blank 201, which continues to be clamped in the chuck 203, can initially be repositioned B-D with respect to the vertical direction V.

Figure 2:
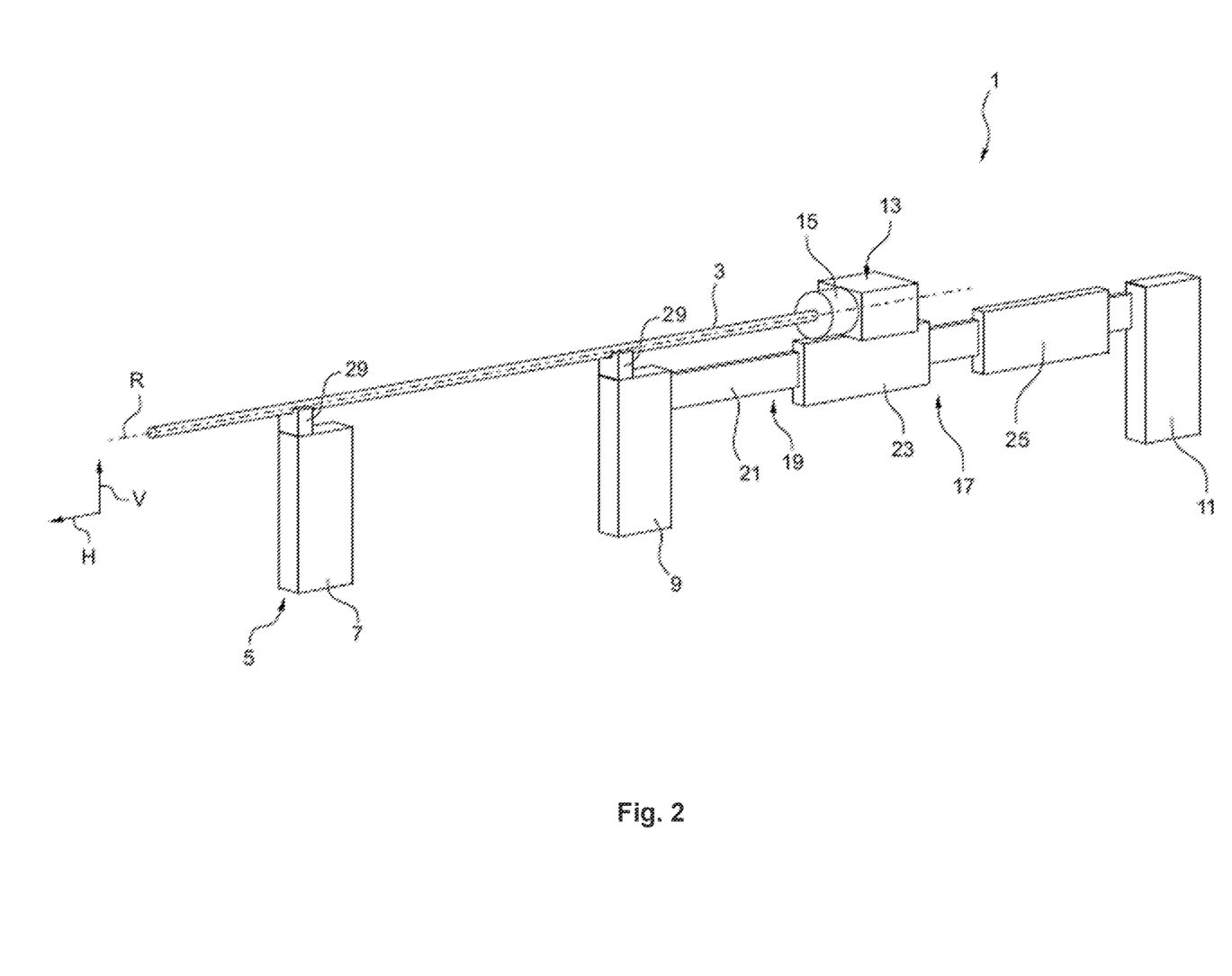
FIG. 2 a schematic representation of a section of a system according to the invention for producing a glass container.

FIG. 2 shows a detail of a system 1 according to the invention for producing a particularly rotationally symmetrical glass container of predetermined axial length in a simplified perspective view. An aspect of the present invention is that the system 1 or particularly its individual components are designed in such a way that a rotational axis R of the rotationally symmetrical glass tube blank 3 to be processed is oriented essentially in the horizontal direction H. In comparison to the prior art, this results in considerably more flexible handling of the system 1 and simplified operating and, particularly, loading of the system 1 with glass tube blanks 3. Particularly, the loading can specifically take place transversely to the rotational axis direction R, which essentially corresponds to a glass tube blank longitudinal direction. In principle, the system 1 according to FIG. 2 comprises a frame 5, which, according to the exemplary embodiment in FIG. 2, has essentially three identically designed support columns 7, 9, 11. The frame 5 carries the further components of the system 1. This includes, inter alia, a chuck 13 for mounting the glass tube blank 3 in a rotating manner. The chuck 13 can, for example, be a 3-jaw chuck. For example, the chuck 13 has a clamping device 15, such as clamping jaws, for at least partially circumferentially encompassing the glass tube blank 3 and for fixing the glass tube blank 3 inside the chuck 13. The chuck 13 can have a driving device (not shown), by means of which the glass tube blank 3 can be rotated, particularly continuously, about its rotational axis R.

According to a further aspect of the present invention, the chuck 13 has a feeding device, which is generally provided with reference sign 17 and is configured to be able to translationally displace the chuck 13, along with the glass tube blank 3 clamped and fixed and mounted in a rotating manner therein. As can be seen in FIG. 2, the translational displacement takes place along the glass tube blank longitudinal direction, i.e., in the horizontal direction H. The feeding device 17 can, for example, have a stepper motor for stepwise translational displacement of the chuck 13. For example, the stepwise movement increments can be matched to a predetermined axial length of the glass containers to be produced.

According to FIG. 2, a linear guide, particularly a rail guide 19, is provided, in order to translationally displace the jaw chuck 13. The linear guide 19 comprises a rail-like sliding device 21, which extends in the horizontal direction H between two of the support columns 9, 11 and along which a guide carriage 23 attached to the chuck 13 can be displaced relatively. As can be seen, for example, in FIG. 2, the guide carriage 23 can be matched to the shape of the rail 19 and/or can be connected thereto in a form-fitting manner. For example, the guide carriage 23 can form the feeding device 17 or can have a driving device, such as the stepper motor, for translationally displacing the jaw chuck 13. Furthermore, a further drive carriage 25 that is in sliding engagement with the rail 21 and can be brought into contact with the guide carriage 23 can be provided, which is configured to displace the guide carriage 23, which does not have a drive unit and is fixedly connected to the jaw chuck 13. During the processing of the glass tube blank 3 and the production of a plurality of glass containers, the glass tube blank 3 is translationally displaced by means of the jaw chuck 13 by a translational movement force by the feeding device 17, in order to move the glass tube blank 3 successively further in the direction of the length-cutting device 27 (see FIG. 3) not shown in FIG. 2, such that a plurality of glass containers can be produced from one glass tube blank 3. The advantage of the system 1 of the present invention is also that due to the translational mobility of the jaw chuck 13, after a separation operation has taken place, the jaw chuck 13 does not have to be opened, in order to reposition the glass tube blank 3. This specifically continues to take place by means of the feeding device 17 with the glass tube blank 3 clamped in the chuck 13.

For further mounting of the elongated glass tube blank 3, two air bearings 29 provided at a horizontal distance from one another are provided between the chuck 13 and the length-cutting device 27, which is not visible in FIG. 2 and which is to be arranged to the far left in FIG. 2. For example, the air bearings 29 may be designed according to one of the aspects or exemplary embodiments according to the invention. The air bearings 29 are held on one of the supports 7, 9 in each case and are arranged in such a way that the air bearings 29 are open upward in the vertical direction V, in order to receive the glass tube blank 3. The air bearings 29 serve to contactlessly mount the glass tube blank 3 and to hold it in position with respect to the rotational direction R so that the separation operation by means of the length-cutting device 27 can take place reliably. For example, the air bearing (on the left in FIG. 2) on the side of the length-cutting device is positioned in the immediate vicinity of the length-cutting device 27. On the one hand, the glass tube blank can be mounted in a rotating manner by means of the air bearing 29 and on the other hand, the air bearing 29 also provides a degree of freedom of translational movement, such that the translational displacement movement, which is initiated by the feeding device 17, can take place without problems, particularly without any mountings having to be removed.

Figure 3:
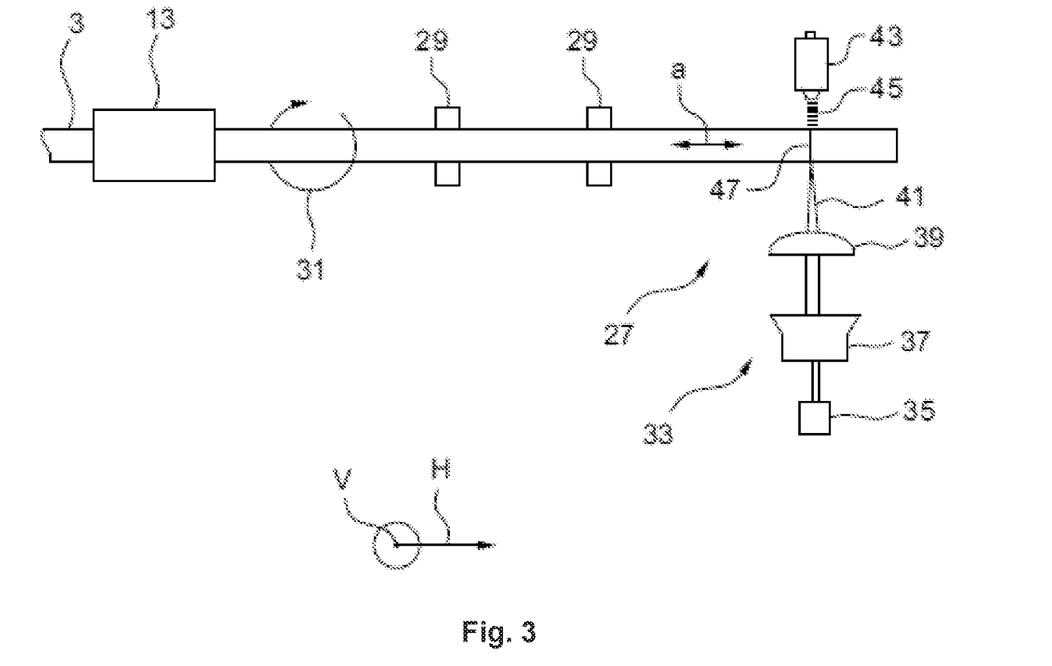
FIG. 3 a schematic top view of the system according to FIG. 2, wherein a length-cutting device of the system is likewise depicted.

In addition, an exemplary embodiment of a length-cutting device 27 is shown in the schematic view according to FIG. 3, which can be viewed as a top view of the system 1 according to FIG. 2. The glass tube blank 3, which is mounted in a rotating manner by the jaw chuck 13, is constantly rotated about its rotational axis R, which is indicated by the curved arrow with reference sign 31. The two air bearings 29 are shown schematically and mount the glass tube blank 3. The length-cutting device 27 can have, for example, a $CO_2$ laser, which is indicated as a whole by reference sign 33, and an energy source 35, a laser device 37 along with a mirror device 39 for focusing a laser beam 41 onto the glass tube blank 3, along with a cooling device 43, by means of which a cooling-fluid jet 45 can be applied to the glass tube blank 3. As can be seen in FIG. 3, both the heating via the $CO_2$ laser 33 and the cooling by means of the cooling device 43 take place locally, particularly at the same local point. This local point, which is provided with reference sign 47, represents that axial point on the glass tube blank 3 at which the glass tube blank 3 is deflected in order to form a glass container. This axial position is fixed. This is realized in that the length-cutting device 33 is positioned in a stationary manner and the glass tube blank 3 is translationally displaceable in the horizontal direction H, which is indicated by reference sign a. Alternatively, for example, a burner could also be provided, in order to heat the glass tube blank 3 locally.

Figure 4:
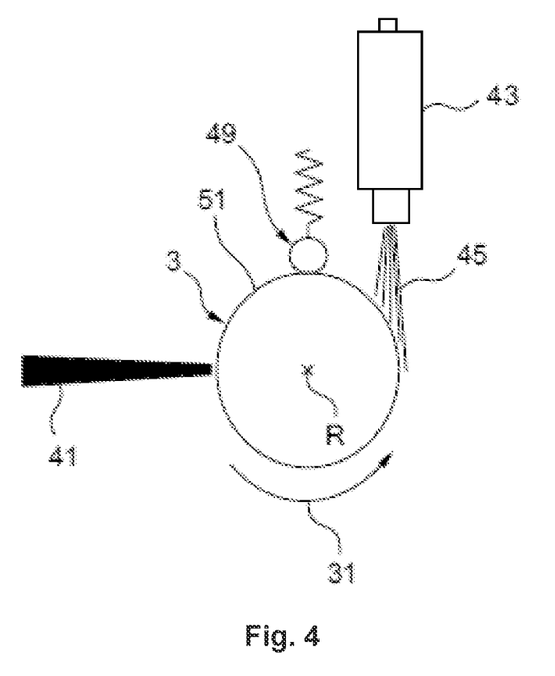
FIG. 4 a schematic frontal view of the system according to FIG. 3.

FIG. 4 shows a frontal view according to FIG. 3 (viewed from the right in FIG. 3), wherein a spring-loaded scoring wheel 49 for pretreatment, particularly scoring, of the separation point 47 is additionally depicted. As can be seen in FIG. 4, the cooling-fluid jet 45 is oriented eccentrically with respect to the rotational axis R of the glass tube blank 3 and is directed essentially tangentially to an outer circumference 51 of the glass raw blank 3. It was found that the eccentricity or the offset has an advantageous effect on the effectiveness of the cooling of the heated glass tube blank 3.

Figure 5:
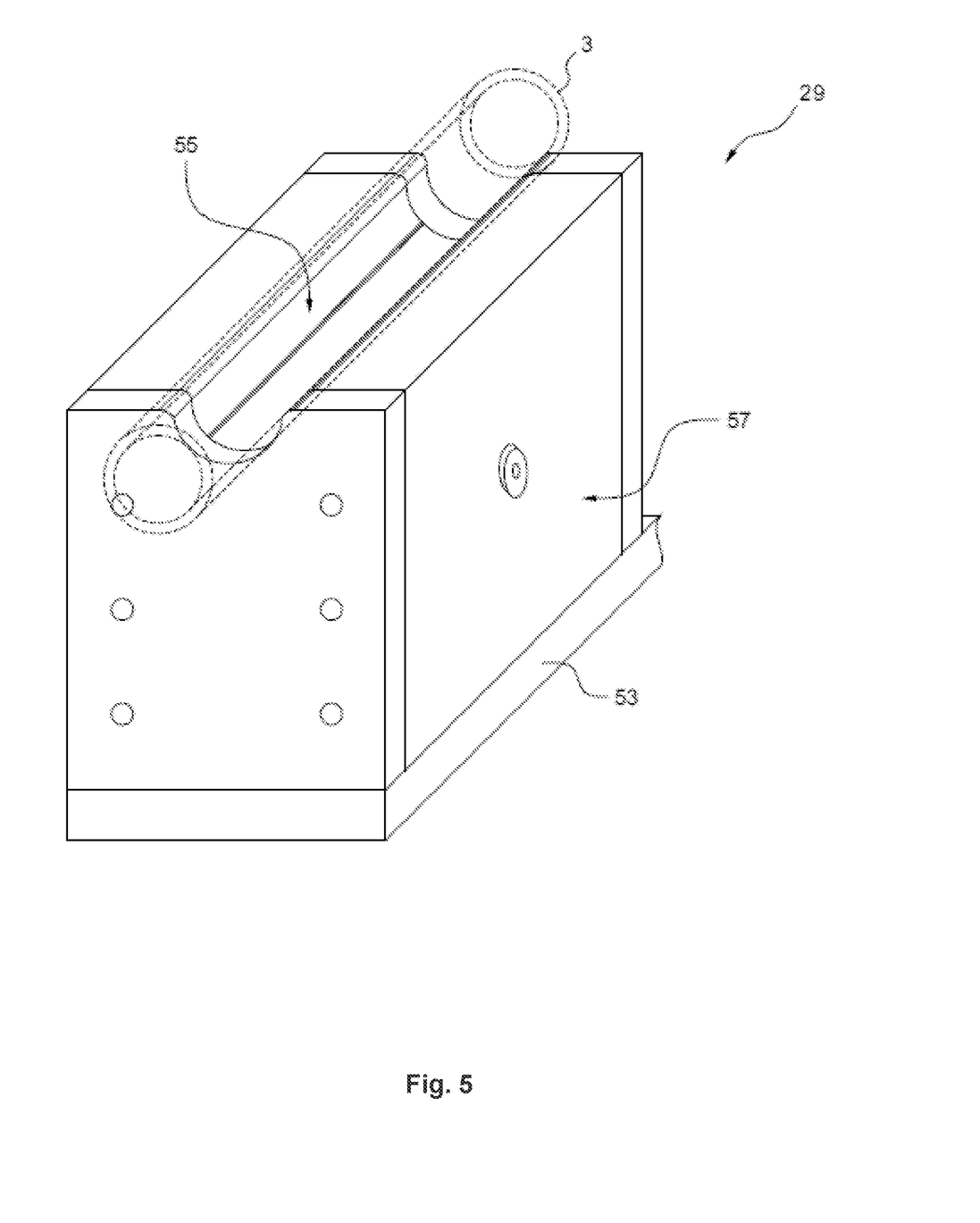
FIG. 5 a perspective view of an exemplary embodiment of an air bearing according to the invention.
Figure 6:
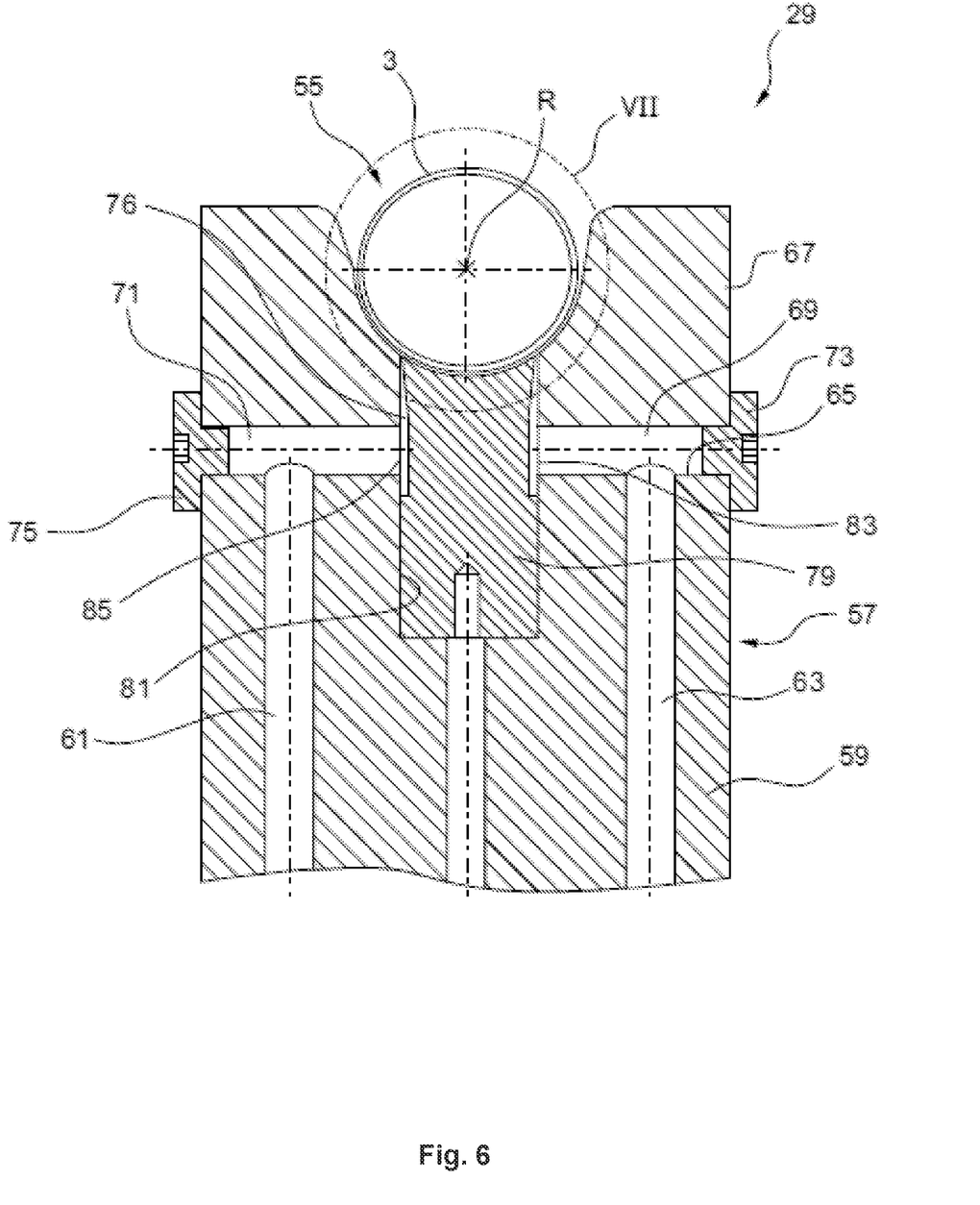
FIG. 6 a sectional view of the air bearing according to FIG. 5.
Figure 7:
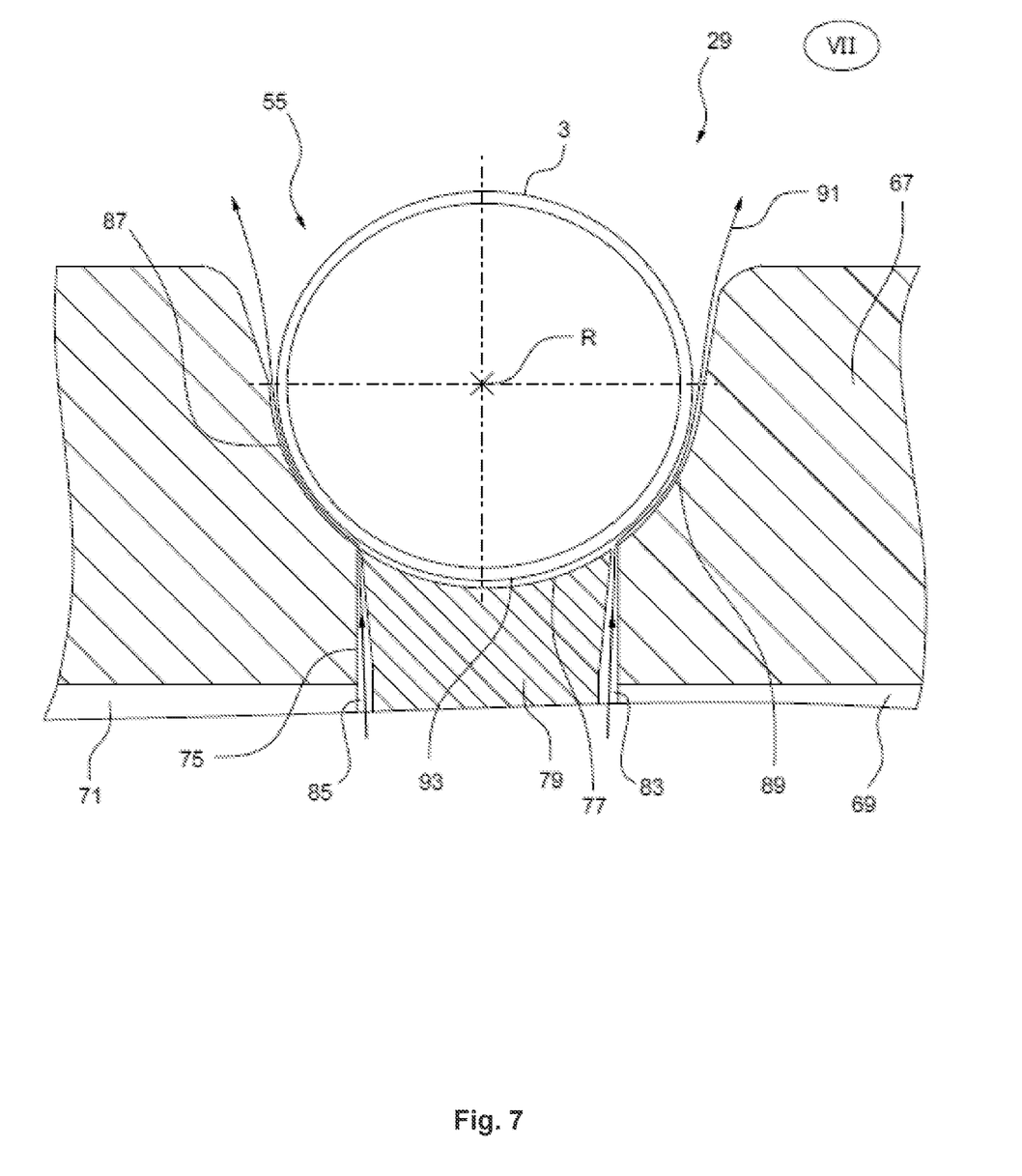
FIG. 7 a detailed view VII according to FIG. 6

FIGS. 5 to 7 explain an exemplary embodiment of an air bearing 29 according to the invention. In general, the air bearing 29 is designed in such a way that it allows contactless mounting of the glass tube blank 3 using the Bernoulli effect, wherein both a degree of freedom of rotation and a degree of freedom of translation are created, resulting in the particularly flexible system according to the invention for producing glass containers. The basic structure of the air bearing 29 can be seen in FIG. 5; the functionality of the air bearing 29 is described above all with reference to FIGS. 6 and 7. The air bearing 29 can comprise an essentially flat support 53 and a housing 57, which forms a receptacle 55 for the glass tube blank 3 and is connected to the support 53. According to the exemplary embodiment in FIG. 5, the housing 57 is formed as an essentially cuboidal block, the extent of which is dimensioned to be greater in the rotational axis direction R of the glass tube blank than transversely to the rotational axis direction R. The glass tube blank 3 mounted by the air bearing 29 and inserted into the receptacle 55 is shown with dashes in FIG. 5 for better illustration of the air bearing 29.

Referring to FIGS. 6 and 7, the exemplary embodiment of the air bearing 29 is described in the sectional view as well as schematically its functionality. Particularly, FIG. 6 shows that the air bearing 29 has a multi-part design, particularly that the housing 57 has a multi-part design. The air bearing 29 comprises a base or base part 59, into which compressed-air channels 61, 63, which are oriented in FIG. 6 essentially in the vertical direction V, for connection to a compressed-air source or a compressed-air generator (not shown). The compressed-air channels 61, 63 end up to an end face 65 forming an upper side of the base 59. A cover part 67, which partially delimits the receptacle 55, is located above the base 59. The cover part 67 is placed onto the base part 59, forming two horizontally oriented compressed-air channels 71, 69, in which the vertical compressed-air channels 61, 63 respectively end. The horizontal compressed-air channels 69, 71 are also sealed laterally, particularly in a fluid-tight manner, by means of seals 73, 75. The housing part 67 has a recess, which is formed on its abutment upper side and which partially forms the receptacle 55. The hollow-cylindrical, rotationally symmetrical glass tube blank 3 is received and mounted in the receptacle 55. The cross-section of the receptacle 55 is adapted in sections to the shape of an outer circumference of the glass tube blank. The housing 67 delimits the receptacle 55 essentially on both lateral sides and has an essentially central recess 75, which ends in the receptacle 55 and into which an insert 79 forming a receptacle base 77 is inserted. The insert 79 is also furthermore received in a central recess 81 inside the base part 59.

The formation of a fluid connection between the compressed-air source (not shown) and the receptacle 55 via the compressed-air channels 61, 63, 71, 69 are crucial for the functionality of the air bearing 29. The insert 79 is recessed on both sides, i.e., assigned to the respective compressed-air channels 69, 71, forming a gap space 83, 85 oriented essentially in the vertical direction. Compressed air can pass via the gap space 83, 85 via the compressed-air channels to the receptacle 55. This means that the housing cover part 67 is arranged at a distance from the insert 79. The gap space 83, 85 increasingly tapers toward the receptacle 55, in order to bring about a sort of nozzle effect that is ultimately responsible for the Bernoulli effect for producing the bearing and/or holding force for the glass tube blank 3.

Referring to FIG. 7, the receptacle 55 is depicted in detail. It can be seen that the housing part 67 forms two lateral receiving flanks 87, 89 for delimiting the receptacle 55, which are essentially concavely curved at least in sections. Together with a likewise concavely curved receptacle base 77, which is formed by the insert 79, a receptacle 55 which is essentially adapted to the shape of an outer circumference of the glass tube blank 3 is formed, wherein it is ensured that there is a continuous distance between the glass tube blank 3 and receptacle walls 77, 87, 89. A compressed-air flow, which produces the air film between the glass tube blank 3 and the receptacle wall for contactlessly mounting the glass tube blank 3, is indicated by means of the arrow with reference sign 91. A distance, particularly a vertical distance, which is adjusted between the receptacle base 77 and the glass tube blank 3 and defines a gap space 93, is in the range of 0.05 mm to 0.5 mm, particularly approximately 0.2 mm. Viewed in the rotational axis direction R, an essentially uniform distance or gap exists between the glass tube blank 3 and the receptacle side flanks 87, 89 of approximately 0.05 mm to 0.15 mm, for example 0.09 mm. The gap spaces have proven to be advantageous in the system according to the invention for producing glass containers. For example, the compressed air provided by the compressed-air source is in a range of 1 bar to 4 bar.

The features disclosed in the above description, the figures and the claims may be important both individually and in any combination for realizing the invention in the various embodiments.

LIST OF REFERENCE SYMBOLS

1 System
3 Glass tube blank
5 Frame
7, 9, 11 Support column
13 Chuck
15 Clamping device
17 Feeding device
19 Linear guide
21 Rail
23 Guide carriage
25 Drive carriage
27 Length-cutting device
29 Air bearing
31 Rotational movement
33 $CO_2$ laser
35 Energy source
37 Laser source
39 Mirror device
41 Laser beam
43 Cooling device
45 Cooling-fluid flow
47 Local cutting point
49 Scoring wheel
51 Outer circumference
53 Support
55 Receptacle
57 Housing
59 Base part
61, 63, 71, 69 Compressed-air channel
65 Upper side end face
67 Cover housing part
73, 75 Seal
77 Receptacle base
79 Insert
81 Recess
76 Recess
83, 85, 93 Gap space
87, 89 Receptacle side flank
91 Compressed-air flow
93 Gap space
200 Tube cutter under the prior art
201 Glass tube blank
203 Jaw chuck
205 Positioning station
206 Separation operation
207, 209, 211 Stop plate
213 Glass container
215 Scoring device
217 Heating device
219 Cooling device
221 Warming device
223 Melting device
A-K Tube cutter under the prior art stations
B-D Positioning station
E-J Separation operation
V Vertical direction
H Horizontal direction
R Rotational direction
a Translational movement

The invention claimed is:

1. A system for producing a rotationally symmetrical glass container from a rotationally symmetrical glass tube blank, which defines a rotational axis, said system comprising:
a chuck for mounting the glass tube blank in a rotating manner, wherein the chuck is configured to encompass and contact an outer surface of the glass tube blank;
a length-cutting device for cutting to length glass containers of predetermined length from the glass tube blank;
an air bearing arranged downstream of the chuck and upstream of the length-cutting device and for contactlessly mounting the glass tube blank; and
a feeding device able to translationally move the glass tube blank toward and away from the length-cutting device without opening the chuck or releasing the glass tube blank from the chuck, wherein the feeding device comprises a rail guide and moveable guide carriage able to displace the chuck and the glass tube blank relative to a stationary housing of the system and in a direction toward the length-cutting device, and wherein the feeding device is able to move the chuck and glass tube blank a predetermined distance toward the length-cutting device after a first cut of the glass tube blank has been made by the length-cutting device without opening the chuck or releasing the glass tube blank, wherein the predetermined distance is the same as the predetermined length of the glass containers.

2. The system according to claim 1, wherein the air bearing comprises a receptacle for the glass tube blank, which extends along the rotational axis of the glass tube blank and is adapted at least in sections to a shape of an outer circumference of the rotationally symmetrical glass tube blank.

3. The system according to claim 2, wherein the receptacle is essentially partially cylindrical, wherein particularly the receptacle is shaped concavely in sections and/or convexly in sections, and wherein a concave section of the receptacle forms a receptacle base and/or a convex section forms a receptacle side flank.

4. The system according to claim 1, wherein the air bearing is arranged at an axial position in the range of ⅓ to ⅔ of an axial distance between the length-cutting device and the chuck.

5. The system according to claim 1, wherein the air bearing comprises:
a compressed-air source; and
a receptacle for the glass tube blank, which extends along the rotational axis of the glass tube blank and is adapted at least in sections to a shape of an outer circumference of the rotationally symmetrical glass tube blank in such a way that the glass tube blank is mounted contactlessly when the receptacle is supplied with compressed air by the compressed-air source.

6. The system according to claim 1, wherein the glass tube blank is able to be contactlessly mounted in the receptacle in such a way that a distance between the receptacle and the glass tube blank is in the range of 0.05 mm to 0.5 mm.

7. The system according to claim 5, wherein the receptacle is partially open in cross-section, such that the glass tube blank is able to be inserted into the receptacle in a direction transverse to the rotational axis.

8. The system according to claim 5, wherein the glass tube blank is able to be contactlessly mounted in the receptacle in such a way that a distance between the receptacle and the glass tube blank is in the range of 0.01 mm to 0.3 mm.

9. The system according to claim 5, wherein the receptacle has a concave receptacle base and two opposite, convex, receptacle side flanks, each of which is arranged at a distance essentially constant in the rotational axis direction, forming a gap space to the receptacle base, wherein the gap space forms a fluid connection between a compressed-air source and receptacle.

10. The system according to claim 1 further comprising at least one further air bearing for contactlessly mounting the glass tube blank, wherein the at least one further air bearing is arranged from the chuck at an axial position in the range of ¼ to ½ of an axial distance between the length-cutting device and the chuck.

11. The system according to claim 1 further comprising at least one further air bearing for contactlessly mounting the glass tube blank, wherein the at least one further air bearing is arranged from the chuck at an axial position of at least ¾ of an axial distance between the length-cutting device and the chuck.

* * * * *